United States Patent
Koetter

(10) Patent No.: US 10,834,298 B1
(45) Date of Patent: Nov. 10, 2020

(54) SELECTIVE AUDIO VISUAL SYNCHRONIZATION FOR MULTIPLE DISPLAYS

(71) Applicant: Disney Enterprises, Inc., Burbank, CA (US)

(72) Inventor: Brent T. Koetter, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/601,434

(22) Filed: Oct. 14, 2019

(51) Int. Cl.
*H04N 5/932* (2006.01)
*H04N 5/04* (2006.01)
*H04N 5/445* (2011.01)
*G06F 3/0482* (2013.01)

(52) U.S. Cl.
CPC ............... *H04N 5/04* (2013.01); *H04N 5/445* (2013.01); *G06F 3/0482* (2013.01)

(58) Field of Classification Search
CPC .. H04N 21/4307; H04N 21/4302; G09G 5/00; G09G 5/12; G09G 5/14; G02F 2001/133331; G06F 3/1446; G06F 3/1454
USPC ................... 386/203, 202, 201, 207
See application file for complete search history.

(56) References Cited

U.S. PATENT DOCUMENTS

| | | | |
|---|---|---|---|
| 8,606,072 B2 | 12/2013 | Ido | |
| 9,575,715 B2 | 2/2017 | Duwenhorst et al. | |
| 9,979,997 B2 | 5/2018 | Schneider et al. | |
| 2011/0153330 A1 | 6/2011 | Yazdani et al. | |
| 2011/0222839 A1* | 9/2011 | Ohhara | G11B 27/10 386/353 |
| 2014/0079368 A1* | 3/2014 | Sasaki | H04N 21/4307 386/207 |
| 2017/0249611 A1 | 8/2017 | Trachtenberg et al. | |
| 2019/0118087 A1 | 4/2019 | Lockton et al. | |

OTHER PUBLICATIONS

Autodesk Knwoledge Network, "Flame Products 2019", Audio Preferences, (Accessed Oct. 7, 2019), 10 pages.
Free Help and Resources, Ryan Victoria, "How to Sync Audio and Video Manually", https://showmore.com/sync-audio-and-video.html, Feb. 20, 2017, 6 pages.
Informer Technologies, Inc., "Audio Delay 1.1", https://audio-delay1 .software.informer.com/1.1/, (Accessed Aug. 21, 2019), 4 pages.
Merging Technologies, Inc., "User Manual-Pyramix V12", https://www.merging.com/uploads/assets/Installers/IRIS_X.0.4/Pyramix_v12.0.4/Pyramix_V12_User_Manual.pdf, Jul. 22, 2019, 844 pages.

* cited by examiner

*Primary Examiner* — Robert Chevalier
(74) *Attorney, Agent, or Firm* — Dorsey & Whitney LLP

(57) ABSTRACT

The present disclosure generally relates to synchronization between multiple displays for audio and/or visual content. Video, movie, television, live broadcast, streaming or online content typically include visual content and corresponding audio content synchronized to the visual content, i.e., a particular audio frame is set to be play backed at the same time a particular video frame is displayed. The present disclosure provides for delaying the presentation of visual content with respect to one or more displays in order to synchronize the presentation of the visual content on the displays.

20 Claims, 6 Drawing Sheets

SELECTIVE AUDIO VISUAL SYNCHRONIZATION FOR MULTIPLE DISPLAYS

TECHNICAL FIELD

The technology described herein relates generally to systems and methods for display and editing of content, such as audio/visual content.

BACKGROUND

Traditional systems for production and post-production engineering or editing of media content such as video, movies, or television often use multiple monitors or displays that display the content, allowing multiple people (often with different focuses) to simultaneously edit content. For instance, a media stream containing both audio content and visual content is played from a workstation to two or more displays. For instance, one display may be associated with a workstation and monitored by a production engineer editing or playing back media content and another display may be monitored by a director, producer or other person reviewing and directing the work of the production engineer, and/or focusing on editing of other aspects or characteristics of the content.

Different displays may exhibit varying display latencies due to various hardware and software characteristics causing a lag or time delta between content (either between the two screens) and/or loss of synchronization between audio content and visual content. These varied content playback issues can make the editing environment difficult for engineers. For example, the audio/visual lag can cause an actor's mouth to move visually without the corresponding audio being played. Notably, even displays of the same manufacturer/model can have different latencies due to issues such as manufacturing variability, firmware differences, configuration settings, or even the lengths and quality of cables that feed media content to the displays.

SUMMARY

A method for synchronizing content playback over multiple displays is disclosed. The method includes: displaying visual content for presentation on a first display of the multiple displays; receiving a user input selecting the visual content; receiving a delay amount to delay presentation of the visual content on a second display of the multiple displays; and displaying, by the processing element, a delayed visual content for presentation on the second display. The delayed visual content includes the visual content delayed by the delay amount such that presentation of the visual content on the first display is synchronized with the presentation of the delayed visual content on the second display.

A system for synchronizing content is disclosed. The system includes a workstation. The workstation includes: a processing element; a memory component in communication with the processing element that stores visual content retrievable by the processing element; and a video interface operable to transmit the visual content to a first display and a second display. The processing element is operable to transmit, via the video interface, the visual content to one of the first or second displays and to delay transmission of the visual content by a delay amount to the other of the first or second displays.

A computer readable medium is disclosed. The computer readable medium includes instructions that when executed by at least one processor of a computing system cause the computing system to perform a method that includes: displaying visual content for presentation on a first display; receiving a user input selecting the visual content; receiving a delay amount to delay presentation of the visual content on a second display; and displaying, by the processing element, a delayed visual content for presentation on the second display. The delayed visual content includes the visual content delayed by the delay amount. Presentation of the visual content on the first display is synchronized with the presentation of the delayed visual content on the second display.

DETAILED DESCRIPTION

The present disclosure generally relates to synchronization between multiple displays for audio and/or visual content. Video, movie, television, live broadcast, streaming or online content typically includes visual content and corresponding audio content synchronized to the visual content, i.e., a particular audio frame is set to be play backed at the same time a particular video frame is displayed.

Post production editing for content generally includes multiple users, such as a sound engineer, video engineer, one or more artistic directors, and the like, that update, vary, and combine different content frames to achieve a desired final product. Typically, one or more of the users experience and edit the content together during an iterative process and may utilize a production engineering system. A production engineering system typically includes a workstation, local station display, and one or more additional or visual displays, as well as audio outputs (e.g., speakers). The workstation is used to record, modify, create, edit and play media content and can include a local display. The displays in a production engineering system can exhibit varying latencies that can result in a time delta between when they display visual content.

The present disclosure includes a method to selectively activate a latency within one or more monitors or displays and/or of content displayed within a portion of the displays or monitors, such as on a local workstation monitor, in order to match the latency in audio or visual content to the other output systems within the processing system. For example, a user may activate a "hot key" or otherwise provide an input that automatically activates a selected or variable display latency to a particular window or display. This selective latency allows an engineer to easily and quickly synchronize content with the other outputs in the room to more easily edit the content.

Figure 1:
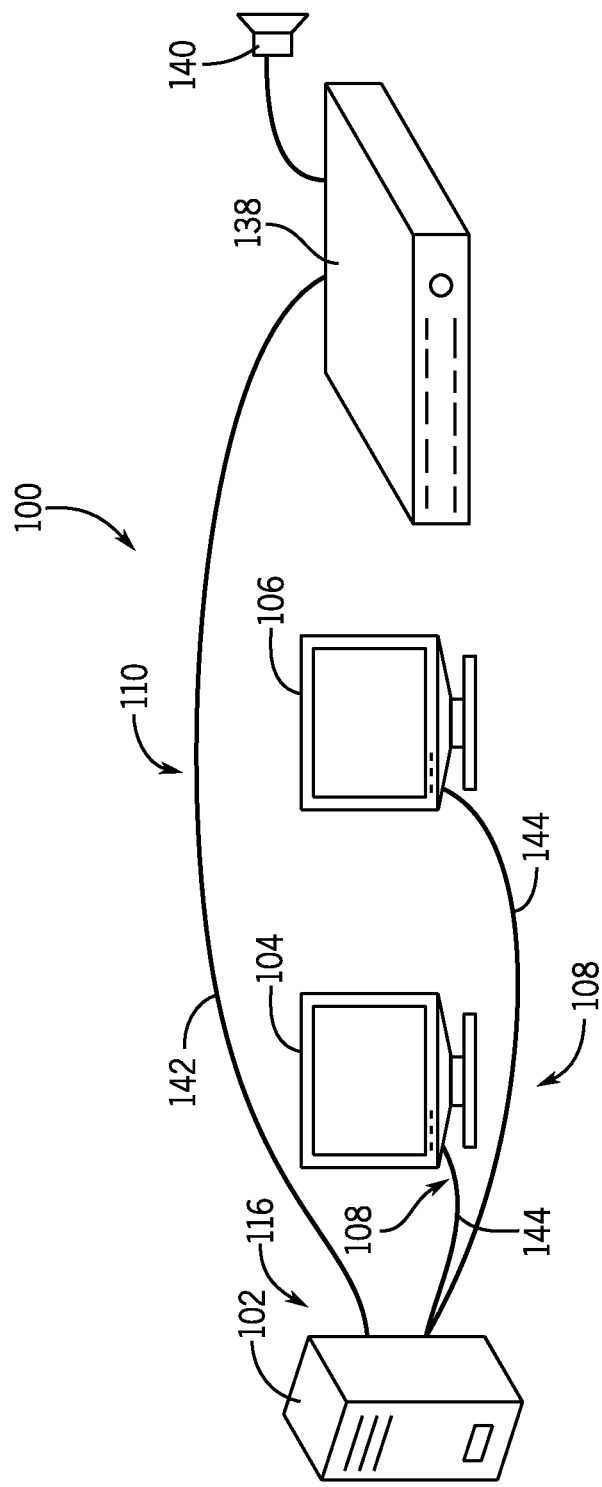
FIG. 1 is a perspective view of a production system including multiple displays.
Figure 2:
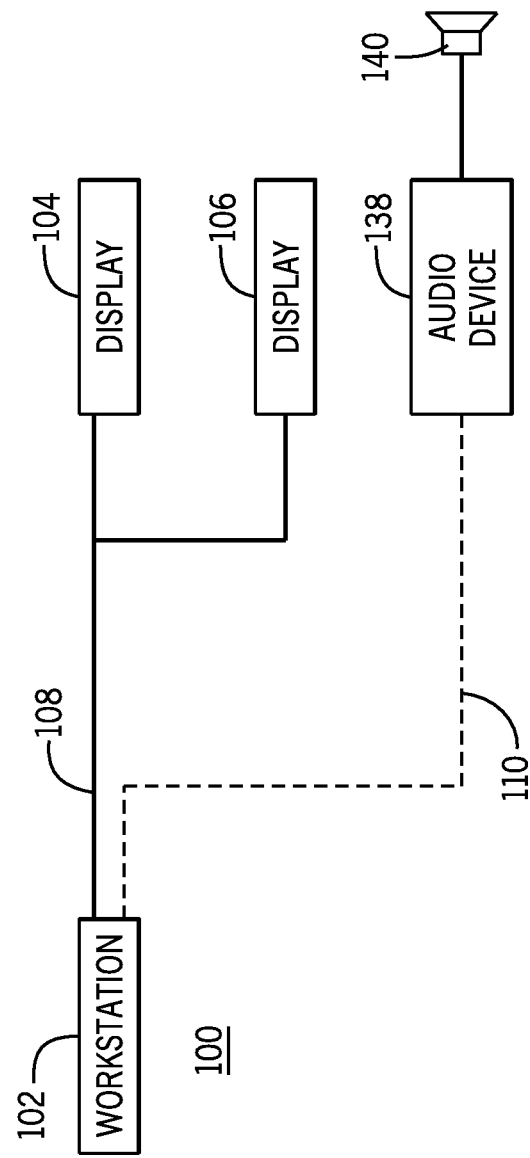
FIG. 2 is a simplified schematic of the production system of FIG. 1.

Turning to the figures, FIGS. 1 and 2 illustrate a production engineering system 100 including a workstation 102, a workstation display 104, additional display 106, such as a director's full screen studio display, and an audio device 138. Generally, the workstation 102 provides visual content 108 to the workstation or local display 104 and/or one or more additional displays 106, which may include one or more large format displays, as well as audio content 110 to the audio device 138 that may output the audio via audio outputs 140, such as speakers (either onboard the workstation 102 and/or separate therefrom).

The displays 104, 106 may be a liquid crystal display (LCD) screen, plasma screen, light emitting diode screen, an organic light emitting diode (LED) screen, cathode ray tube, a projector such as a digital light processor, or the like. The type and number of displays 104, 106 may vary such that different types of displays are included in the system 100. For example, the display 104 may be a local display connected to the workstation 102 and may be a relatively small LCD display (or set of displays) with an LED backlight. The display 106 may be a projector or series of projectors that display visual content on a large screen adapted to be viewed by more than one user at a time. The system 100 may include other displays such as smaller, personal monitors, and even displays associated with mobile electronic devices such as smart phones, tablets or the like. For example, a system 100 may have a third, fourth, or additional displays.

The displays 104, 106 receive visual content 108 from the workstation 102 via a video interface 116. The visual content 108 may be a video stream, such as a sequence of video or image frames played in succession. The visual content 108 may also include text, symbols, or words displayed on a display, such as closed captioning, or the like. The visual content 108 may also be one or more still images. The visual content may be uncompressed, or may be compressed, according to a video standard such as the H.264 advanced video coding standard, or the like.

The audio device 138 receives audio content 110 from the workstation 102. The audio content 110 may be one or more audio waveforms with one or more channels. For instance, the audio content may have an audio waveform that contains music, dialogue, sound effects, and/or a score that may include left and right audio channels (i.e., stereo). The audio content may have additional channels, such as various surround sound formats like 7.1, 10.2, 11.1, 22.2, and the like. In some embodiments, the audio device 138 can be associated with a display 104, 106, such as an internal sound processor with audio outputs or speakers 140.

The visual content 108 may be transmitted to the displays 104, 106 by a cable 144 or other communication mechanism and/or may be locally stored on the displays with playback synchronized in other manners. Likewise, the audio content 110 may be transmitted to the audio device 138 by a cable 142 or other manners (e.g., wirelessly), and/or may be stored locally at the playback device. Cables 142, 144 may include components that transmit light signals representing the visual or audio content, such as fiber optic cables. The visual or audio content may be transmitted to the displays 104, 106 by wireless radio or optical signals such as via a wireless network like Wi-Fi, infrared, or the like. In some embodiments, the audio content and visual content can be transmitted in the same cable. For instance, the visual 108 and audio 110 content can be transmitted in an HDMI cable, or via wired network such as via an Ethernet cable. Any or all of these transmission methods and devices may be included in the system 100.

The workstation 102 may be substantially any type of electronic device that can receive, process, and transmit data, such as, but not limited to a, personal computer, computing system, laptop, smart device (e.g., smartphone, smart television, smart glasses, etc.), tablet, server, virtual reality or augmented reality display or headset, or the like. Similarly, the workstation 102 may be substantially any type of device that can receive and process information and may be a collection of one or more virtual processing elements (e.g., cloud computing, virtual machines, and the like) in communication with one another.

Figure 3:
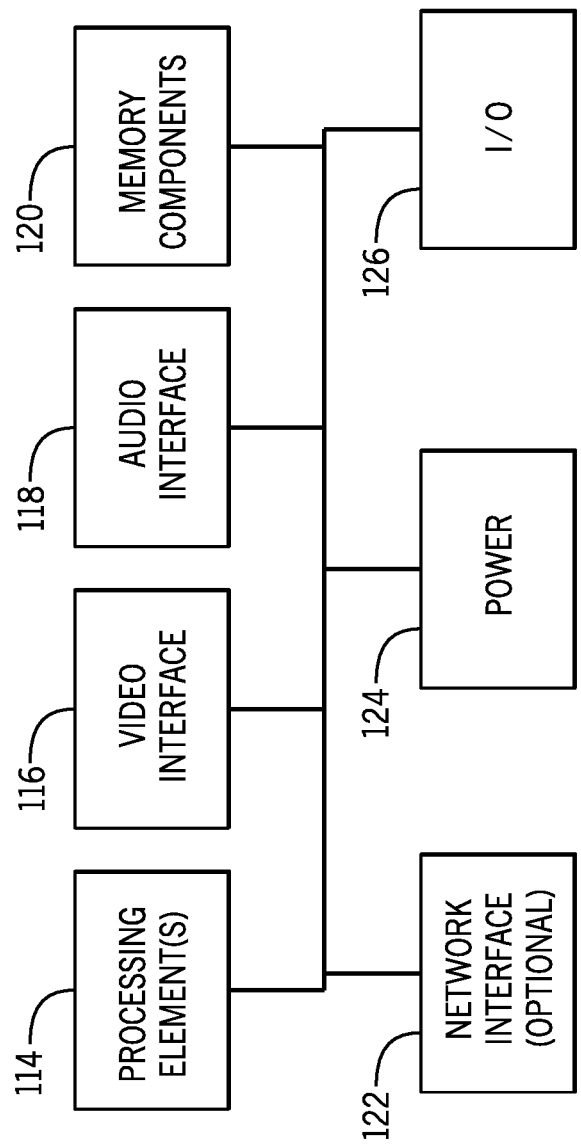
FIG. 3 is a simplified block diagram of a workstation of the production system of FIG. 1.

FIG. 3 illustrates a simplified block diagram for the workstation 102 and/or other computing devices, e.g., smart displays or other elements integrated into the system 100. The workstation 102 may include one or more processing elements 114, a video interface 116, an audio interface 118, one or more memory components 120, a network interface 122 (optional), power 124, and an input/output interface 126. The various components may be in direct or indirect communication with one another, such as via one or more system buses, contact traces, wiring, or via wireless mechanisms.

The one or more processing elements 114 may be substantially any electronic device capable of processing, receiving, and/or transmitting instructions. For example, the processing element 114 may be a microprocessor, microcomputer, graphics processing unit, or the like. It also should be noted that the processing element 114 may include one or more processing elements or modules that may or may not be in communication with one another. For example, a first processing element may control a first set of components of the workstation 102 and a second processing element may control a second set of components of the workstation 102 where the first and second processing elements may or may not be in communication with each other. Relatedly, the processing elements may be configured to execute one or more instructions in parallel, locally, and/or across the network, such as through cloud computing resources.

The video interface 116 provides an input/output mechanism for the workstation 102 to transmit visual information to one or more of the displays 104, 106. The video interface 116 may transmit visual information (e.g., images, graphical user interfaces, videos, notifications, and the like) to the user, and in certain instances may also act to receive user input (e.g., via a touch screen or the like). The video interface 116 can transmit the visual content 108 being produced, edited, or viewed by the system 100. For instance, the video interface 116 can transmit the visual content 108 to the display 104, 106, and may include the visual content 108 with elements of a graphical user interface (GUI). The video interface 116 may transmit the visual content 108 without additional GUI elements. For instance, the video interface 116 may transmit the visual content 108 with GUI elements to the workstation display 104 and may transmit the visual content 108 to another display, such as the display 106, without GUI elements.

The audio interface 118 provides an input/output mechanism for the workstation 102 to transmit audio information to other components of the system 100. The audio interface 118 may transmit the audio content 110 (e.g., the soundtrack or dialog that accompanies the visual content) and it may also transmit sounds or alerts, to draw a user's attention. The audio interface 118 may also transmit audio timing cues such as a click track or metronome.

The memory components 120 may be a computer readable medium operable to store electronic data that may be utilized by the workstation 102, such as audio files, video files, document files, programming instructions, and the like. The memory components 120 may be, for example, nonvolatile storage, a magnetic storage medium, optical storage medium, magneto-optical storage medium, read only memory, random access memory, erasable programmable memory, flash memory, or a combination of one or more types of memory components.

The network interface 122 is optional and can receive and transmit data to and from a network to the various devices (e.g., displays 104, 106 or the audio device 138) in the system 100. The network interface 122 may transmit and send data to the network directly or indirectly. For example, the network interface 122 may transmit data to and from other computing devices through a network which may be a cellular, satellite, or other wireless network (Wi-Fi, WiMAX, Bluetooth) or a wired network (Ethernet), or a combination thereof. In some embodiments, the network interface 122 may also include various modules, such as an API that interfaces and translates requests across the network to other elements of the system 100.

The workstation 102 may also include a power supply 124. The power supply 124 provides power to various components of the workstation 102. The power supply 124 may include one or more rechargeable, disposable, or hardwire sources, e.g., batteries, power cord, AC/DC inverter, DC/DC converter, or the like. Additionally, the power supply 124 may include one or more types of connectors or components that provide different types of power to the workstation 102. In some embodiments, the power supply 124 may include a connector (such as a universal serial bus) that provides power to the computer or batteries within the computer and also transmits data to and from the device to other devices.

The input/output ("I/O") interface 126 allows the workstation 102 to receive input from a user and provide output to the user. For example, the input/output interface 126 may include a capacitive touch screen, keyboard, mouse, pedal, stylus, hotkey, button, joystick, or the like. The type of devices that interact via the input/output interface 126 may be varied as desired. The I/O interface 126 may include a sound mixing board or the like.

Figure 4:
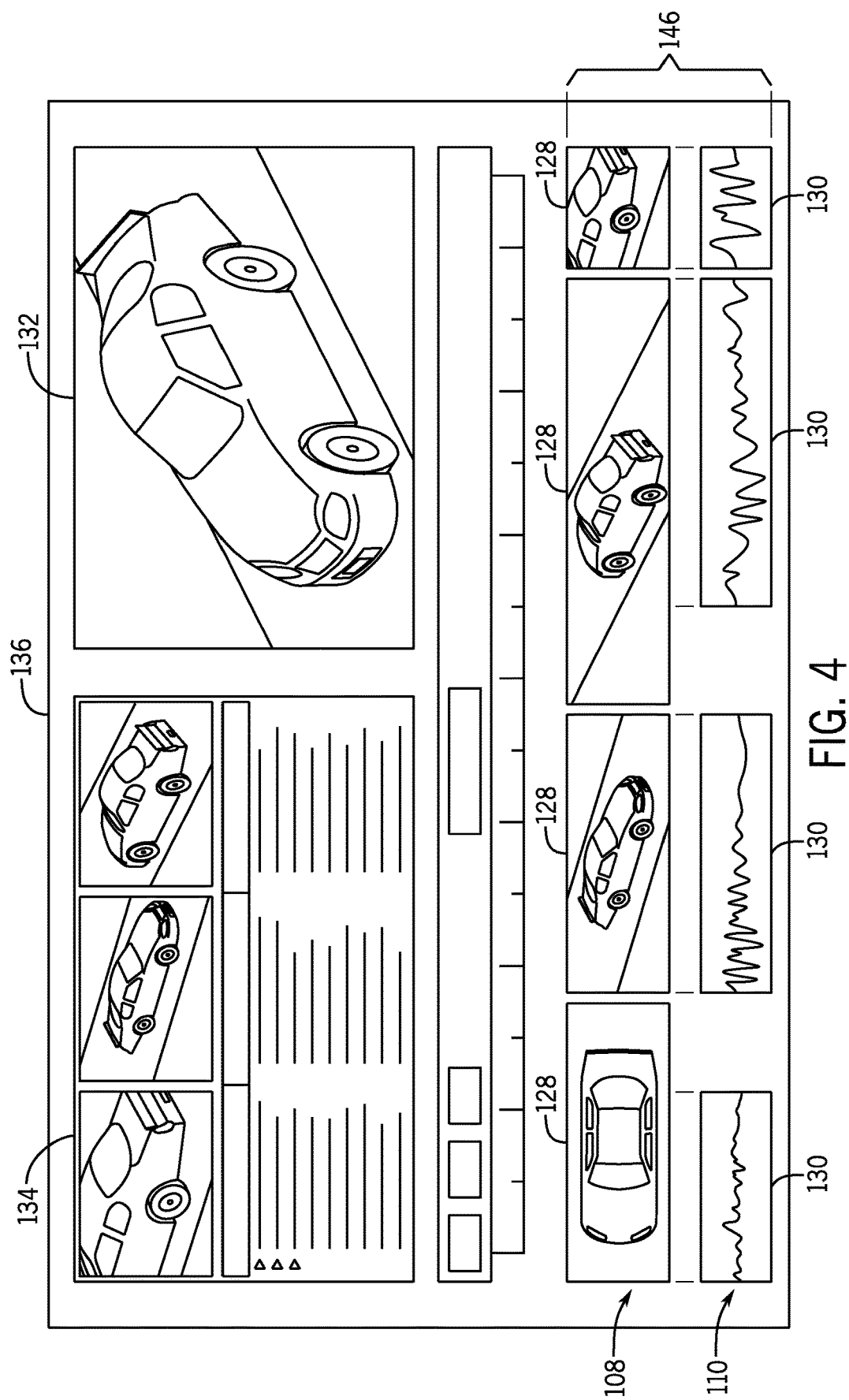
FIG. 4 is a simplified schematic of a graphical user interface of a production environment of the production system of FIG. 1.

Referring to FIG. 4, the workstation 102 may display the visual content 108 within a graphical user interface 136, such as an editing environment or software like Avid® Media Composer®, Adobe Premiere®, Autodesk® Flame®, Apple® Final Cut Pro®, or the like. The GUI 136 may include one or more windows, or areas within a window, adapted for different purposes. For example, one window may be a viewer 132 that displays visual content 108, another window may be a timeline 146 that displays a time progression of audio 110 and/or visual 108 content, another window may be a browser 134 that lists various repositories or files containing visual content 108 or audio content 110 available to add to the timeline 146, etc. Any of these windows can be omitted, additional windows can be added, and it is possible to have more than one window of the same type. The timeline 146 may contain one or more visual elements or clips 128 that includes the visual content 108. Likewise, the timeline 146 may contain one or more audio elements 130 that comprise the audio content 110. Certain visual elements 128 may be composited with certain other visual elements 128, such that the visual elements are superimposed to comprise the visual content 108. The same may be true for audio elements 130 with respect to the audio content 110. The user may use the I/O interface 126 to interface with the GUI 136 to edit audio content 110 and/or visual content 108 into media content which can be played via the one or more displays 104, 106 connected to the workstation 102.

Figure 6:
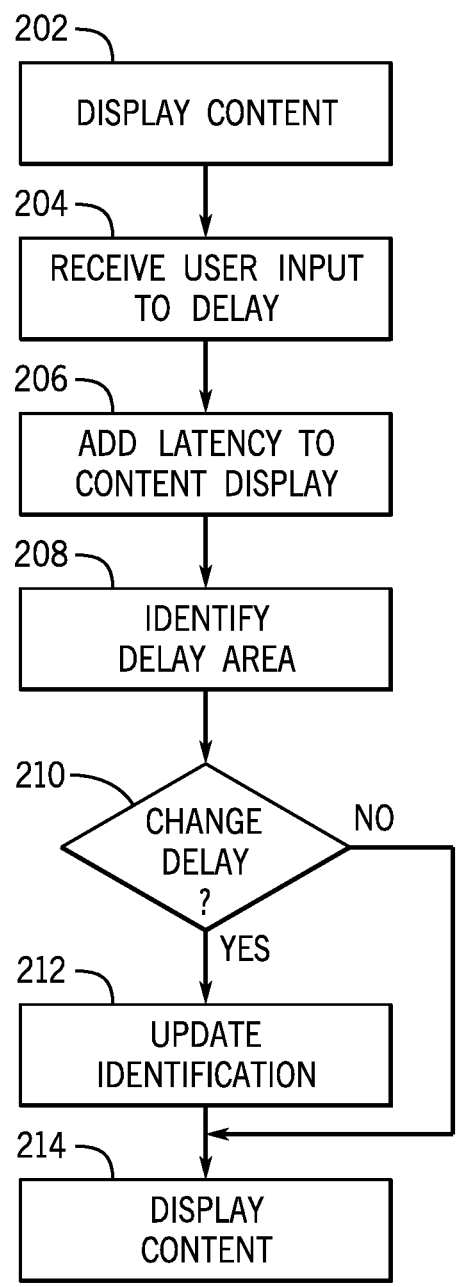
FIG. 6 is a flowchart showing a method of synchronizing content according to the production system of FIG. 1.

FIG. 6 illustrates a method 200 of synchronizing content for a display 104, 106 in the system 100. The operations of the method 200 may be performed in alternative order from that presented without deviating from the present disclosure. With reference to FIG. 6, the method 200 may begin in operation 202 and the workstation 102 begins presenting or playing content. For example, the user may provide an input to the workstation 102 and/or system 100 that initiates the content playback, e.g., selects "play" for a media player or the like. The content may be either visual content 108, audio content 110, or both. For example, the user may have loaded or otherwise provided the video card access to one or more visual clips 128 and/or audio clips 130. The user may arrange the visual clips 128 and/or audio clips 130 in a sequential fashion along a timeline, for example as illustrated in FIG. 4, into visual content 108 or audio content 110, such as a movie. The user may select or otherwise indicate via the I/O interface 126 that the user wishes to play or present the content. The content may also be provided, e.g., via streaming, data transfer, or the like, to the other displays within the environment. In other words, as the workstation begins to playback content, the content (either from the same file or a copy thereof) may be simultaneously presented within the environment.

As the content begins playing, the method 200 may proceed to operation 204 and the processing element 114 of the workstation 102 receives an input to delay display or presentation of the content. For example, the user may select a certain window or area within the GUI 136 that the user wishes to delay, such as the viewer window 132, and provide an input to the workstation 102 regarding the delay, such as selecting a delay icon, pressing a key on the keyboard, hovering over a particular area, or the like. In another example, the user may select the timeline 146, a visual clip 128, an audio clip 130 or a set of clips.

For example, the user may select the content to be delayed by any suitable method available within the GUI and supported by the I/O interface. In a specific example, the user may activate a "hot key" such as on a keyboard or otherwise provide an input that automatically activates a selected or variable display latency to a particular window or display. In another example, the user may select a region, such as vertices of a polygon (e.g., a rectangle) to indicate that content within the polygon should be delayed.

In some embodiments, the workstation 102 may automatically activate the delay. For example, the content to be delayed may be selected automatically as the content is played, such as by pressing a physical or virtual play button. In another example, the content can be selected by a menu such as a dropdown menu. In another example, the workstation 102 may automatically determine content to be delayed based on feedback from a display in the system 100. For example, the workstation 102 may detect latency of the presentation of visual content 108 in a display such as the display 106, via a camera or other sensor, and may automatically delay the visual content 108 as displayed on another display such a local display 104. The workstation 102 may automatically determine that the presentation of visual content 108, or a portion of visual content 108, on the display 104, should be delayed such that the presentation of the visual content 108 on the displays 104 and 106 is synchronized.

The visual content 108 may contain information indicating that it should be delayed. For example, the visual content 108 may contain data or a signal that indicates to the processing element 114 that the visual content 108 should be delayed and may also indicate the amount of that delay. The data or signal may or may not be displayed with the visual content. For example, a small area of the visual content 108, such as a pixel or group of pixels may be coded with a certain color or other property that indicates delay characteristics, yet may be small enough not to be noticed by a viewer.

The processing element 114 may determine that content should be delayed based on data received from the displays 104, 106. For example, a processing element 114 may communicate with a display, and determine, receive, or look up the latency characteristics of the display. For example, the processing element 114 may communicate with the displays 104 and 106 and receive display information such as the make, model, or serial number of the displays. The displays 104, 106 may directly provide latency information, or the latency information could have been pre-determined and saved in a lookup table that the processing element can access using the display information to determine that content should be delayed.

The method 200 may proceed to operation 206 and the latency or delay amount to be added to the content is determined. For example, the workstation 102 may receive the latency input from a user and/or may automatically determine a value (e.g., a standard or present value, a dynamic value, or the like). For example, the user may indicate that content is to be delayed by a time value, such as a number of milliseconds. Time values may be longer, such as a second or several seconds, and they may be smaller, such as microseconds. In another example, the user may indicate that the content is to be delayed by a discrete unit, such as a number of visual frames or audio samples. For example, if audio content is encoded at 44,100 Hertz, that audio content 110 has a sample approximately every 23 microseconds. A delay amount can be specified as a number of samples and can be correlated to time via the sampling rate of the visual 108 or audio 110 content. In another example, the delay may be determined automatically, such as by sensors or other devices that measure a time delta between displays 104 and 106. For example, the workstation 102 can display a visual test signal to a display, and can detect via a camera or other sensor, the latency between when that test signal was sent and when it was displayed. A processing element of the workstation 102 or another processing element can determine the delay amount from the display latency. Delay amounts can be determined for one or more displays. For example, a system 100 may include three displays: two displays 104 local to the workstation 102, and a studio display 106. In this example, delay amounts for the content can be determined for the two local displays 104. The delay amounts for the first local display 104 may be the same as, or different (i.e., more or less) than, the delay amount for the second local display 104. In another example, the delay may be pre-determined or pre-set. For example, once the appropriate delay is determined for the various displays 104, 106 in the system 100, the delay can be recorded in the memory component 120 for later retrieval and activation. The processing element 114 delays presentation of the content by the delay amount. For example, a video clip 128 may be delayed by three frames, and/or an audio clip may be delayed by fifteen samples.

In another example, the workstation 102 may delay the playback of audio content 110 based on the latency of a display such that the audio content 110 is synchronized with the presentation of the visual content 108 on the display. For example, if a display 106 (e.g., a director's full screen display) has a certain latency or time delta in its presentation of the visual content 108, the processing element 114 may delay the playback of the audio content 110 by an amount to match the latency in the display 106, thereby synchronizing the audio content 110 and the visual content 108 with respect to the display 106. The audio may be delayed by another device in the system, such as the audio device 138. The processing element 114 may delay the display of the visual content 108 on another display (e.g., a local display 104) by an amount such that the visual content 108 is synchronized on both displays 104, 106 and with the audio content 110. Presentation of the visual content 108 may be delayed by a first delay amount, while presentation of the audio content may be delayed by a second delay amount. In some examples, the first delay amount is different from the second delay amount.

Figure 5:
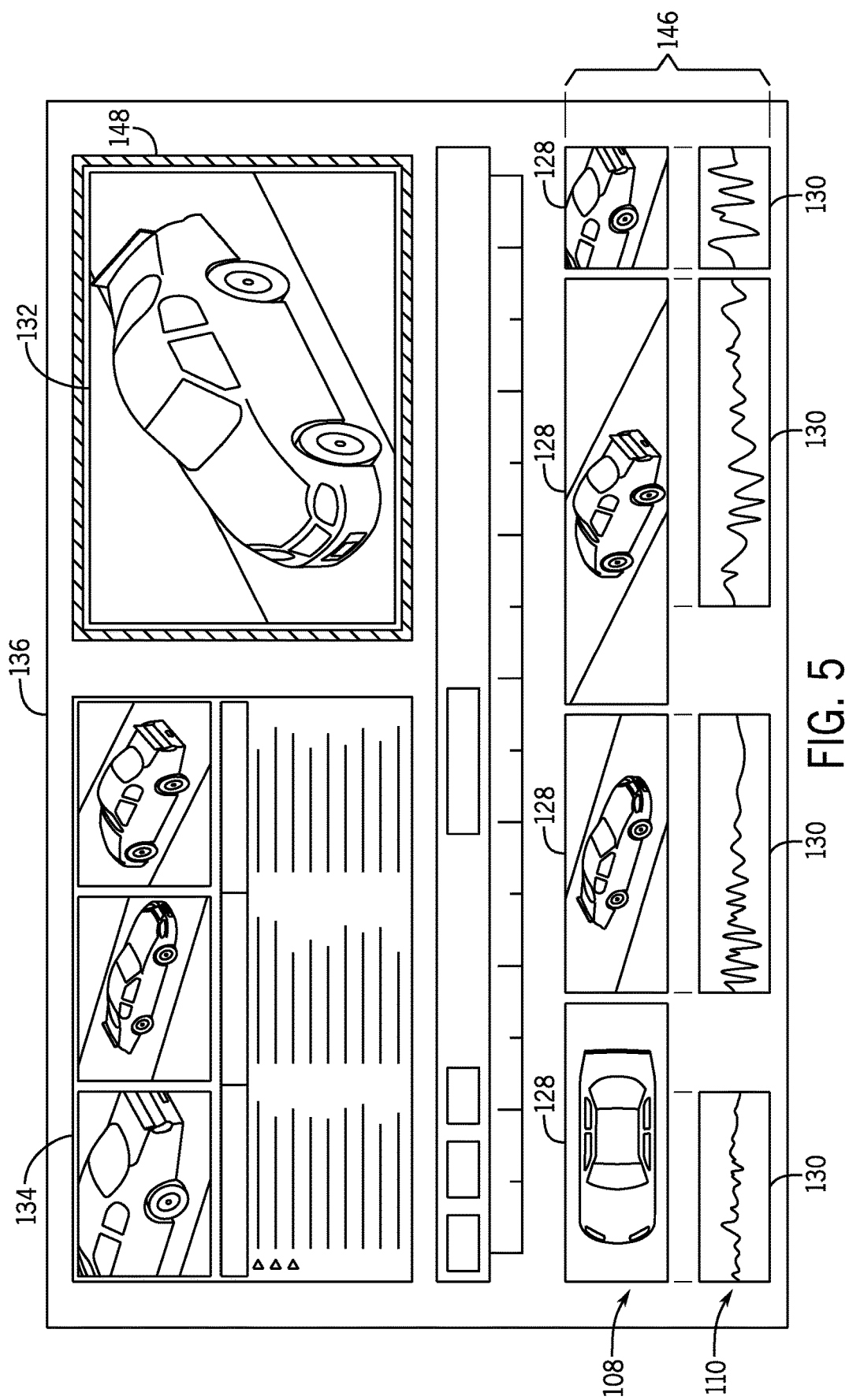
FIG. 5 shows the graphical user interface of FIG. 4, with an indicated area of delay.

The method 200 may proceed to operation 208 and the processing element 114 displays an identification of the content being delayed. For example, as shown in FIG. 5, the processing element 114 may cause a highlight or change of color, pattern or texture to an area or window 148 of the GUI 136 that contains the content being delayed. For instance, the viewer 132 could be surrounded by a colored border, or could flash, pulsate or blink. In another example, the processing element 114 may display an overlay composited with or over the delayed portion of the GUI 136. Such an overlay could indicate that the portion is being delayed and it could also indicate the delay amount, such as a time or number of discrete elements like frames or samples. The indication of the delay may appear on one display, for example a local workstation display, and not on another display, for example a director's full size studio display.

The method 200 may proceed to operation 210 and the user or the processing element 114 may indicate whether the delay amount should change. For example, the user may strike a hotkey a keyboard to indicate an increase or decrease in the delay, and may also indicate an amount of that increase or decrease. In examples where the delay amount is automatically determined by the processing element 114, a change to the delay amount may happen automatically, such as with an automatic calibration where the processing element 114 adjusts the delay of content, and detects whether the content is synchronized among the displays 104, 106 of the system 100. Additionally, in operation 210, the user and/or the processing element 114 may indicate the delay should be disabled. For example, if the I/O interface receives movement of a pointer such as a mouse, the processing element 114 may disable the delay of content. The delay may also be disabled by striking a hotkey, which may be the same hotkey used to enable the delay, or a different hotkey. In another example, the delay can be disabled when a key on a keyboard is struck. Thus, the delay may be seamlessly disabled when a user is actively editing the content.

The method 200 may proceed to operation 212 and the identification of the delay amount may be updated in the identification presented in operation 208. For example, a text overlay may be updated to reflect the then current delay amount.

The method 200 may proceed to operation 214 and the processing element 114 displays or presents the delayed content, such as via the video interface 116, the audio interface, 118 or both to the displays 104, 106, and/or other display in the system 100. For example, the processing element 114 may display delayed content to a director's studio display (e.g., display 106) while displaying non-delayed content to the workstation display (e.g., display 104). In other examples, different delays can be applied to content for different displays. For instance, a third, or subsequent display with a latency different from those of displays 104 and 106 may be included in the system 100 and the processing element 114 may delay the presentation of content differently for one or all of the displays in the system 100.

The above specifications, examples, and data provide a complete description of the structure and use of exemplary examples of the invention as defined in the claims. Although various examples of the disclosure have been described above with a certain degree of particularity, or with reference to one or more individual examples, those skilled in the art could make numerous alterations to the disclosed examples without departing from the spirit or scope of the claimed invention. Other examples are therefore contemplated. It is intended that all matter contained in the above description and shown in the accompanying drawings shall be interpreted as only illustrative of particular examples and not limiting. Changes in detail or structure may be made without departing from the basic elements of the invention as defined in the following claims.

All relative and directional references (including: upper, lower, upward, downward, left, right, leftward, rightward, top, bottom, side, above, below, front, middle, back, vertical, horizontal, right side up, upside down, sideways, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims. Any references to production or post-production are taken to apply to either production or post-production environments, methods and/or systems.

I claim:

1. A method for synchronizing content playback over multiple displays comprising:
    displaying visual content for presentation on a first display of the multiple displays;
    receiving a user input selecting the visual content;
    receiving a delay amount to delay presentation of the visual content on a second display of the multiple displays; and
    displaying, by a processing element, a delayed visual content for presentation on the second display, wherein the delayed visual content comprises the visual content delayed by the delay amount such that presentation of the visual content on the first display is synchronized with the presentation of the delayed visual content on the second display.

2. The method of claim 1 further comprising identifying, by the processing element, the visual content as being delayed for presentation on the second display.

3. The method of claim 1, wherein the delay amount is based on a latency of the first display in presenting the visual content.

4. The method of claim 3, wherein the processing element displays a test signal and detects, by a sensor, the latency of the first display to determine the delay amount.

5. The method of claim 1 further comprising delaying presentation of audio content by a second delay amount to synchronize the visual content for presentation on the first display with presentation of audio content by an audio device.

6. The method of claim 5, wherein the second delay amount is different from the delay amount.

7. The method of claim 1, wherein the visual content is selected via a graphical user interface and the user input is received via an input/output interface.

8. The method of claim 1, wherein the visual content is selected via a dropdown menu.

9. The method of claim 7, wherein the visual content is selected by selecting a region within the graphical user interface.

10. The method of claim 2, wherein the processing element displays an overlay on the visual content to identify the visual content as being delayed for presentation on the second display.

11. The method of claim 10, wherein the overlay indicates the delay amount.

12. The method of claim 1, wherein the user input comprises activation of a hotkey.

13. The method of claim 7, wherein the input/output interface is operative to receive another user input to disable the displaying of the delayed visual content.

14. The method of claim 13, the another user input is one of a mouse movement or activation of a hotkey.

15. The method of claim 1, wherein the delay amount is determined by a user.

16. The method of claim 1, wherein the delay amount is determined by the processing element.

17. The method of claim 1 further comprising:
    receiving a third delay amount to delay presentation of the visual content on a third display; and
    displaying on the third display, by the processing element, another delayed visual content comprising the visual content delayed by the third delay amount.

18. A system for synchronizing content comprising:
    a workstation, the workstation including:
        a processing element;
        a memory component in communication with the processing element and storing visual content retrievable by the processing element;
        a video interface operable to transmit the visual content to a first display and a second display, wherein the processing element is operable to transmit, via the video interface, the visual content to one of the first or second displays and to delay transmission of the visual content by a delay amount to the other of the first or second displays.

19. The system of claim 17, wherein the workstation includes an input/output interface operable to:
    receive a user input to select the visual content; and
    receive another user input to set the delay amount.

20. A non-transitory computer storage medium including instructions that when executed by at least one processor of a computing system cause the computing system to perform a method comprising:
    displaying visual content for presentation on a first display;
    receiving a user input selecting the visual content;
    receiving a delay amount to delay presentation of the visual content on a second display; and
    displaying a delayed visual content for presentation on the second display comprising the visual content delayed by the delay amount, wherein presentation of the visual content on the first display is synchronized with the presentation of the delayed visual content on the second display.

\* \* \* \* \*